US00RE38001E

(19) United States
(12) Reissued Patent
Adler et al.

(10) Patent Number: US RE38,001 E
(45) Date of Reissued Patent: Feb. 25, 2003

(54) CLEANING WITH LIQUID GASES

(75) Inventors: Robert Adler, Gerosdorf (AT); Stefan Rief, Munich (DE)

(73) Assignee: Linde Gas Aktiengesellschaft, Hoellriegelskreuth (DE)

(21) Appl. No.: 09/585,581

(22) Filed: Jun. 2, 2000

Related U.S. Patent Documents

Reissue of:
(64) Patent No.: 5,759,209
Issued: Jun. 2, 1998
Appl. No.: 08/616,751
Filed: Mar. 15, 1996

(30) Foreign Application Priority Data

Mar. 16, 1995 (DE) ..... 195 09 573

(51) Int. Cl.[7] ..... D06L 1/00; D06L 1/02; B08B 3/08

(52) U.S. Cl. ..... 8/142; 8/137; 8/149.1; 8/158; 8/159; 134/22.18; 134/34; 134/42; 134/25.4

(58) Field of Search ..... 8/142, 137, 149.1, 8/158, 159; 134/22.18, 34, 42, 25.4

(56) References Cited

U.S. PATENT DOCUMENTS 5,267,455 A * 12/1993 Dewees et al. ..... 68/5
5,467,492 A * 11/1995 Chao et al. ..... 8/159

FOREIGN PATENT DOCUMENTS

| | | | |
|---|---|---|---|
| DE | 4230485 | * | 3/1994 |
| EP | 530949 | * | 3/1993 |
| WO | WO-90/06189 | * | 6/1990 |
| WO | WO-92/14558 | * | 9/1992 |
| WO | WO-94/01613 | * | 1/1994 |

OTHER PUBLICATIONS

Kirk–Othmer Encyclopedia of Chemical Technology, 3rd ed., vol. 4, p. 737 (month unknown), 1978.*

* cited by examiner

*Primary Examiner*—Alan Diamond
(74) *Attorney, Agent, or Firm*—Crowell & Moring LLP

(57) ABSTRACT

A method for cleaning objects in a pressure vessel with liquefied gases is provided. The gas liquefied under pressure is conducted into the pressure vessel. The temperature of the liquefied gas then, or beforehand, is lowered below the critical temperature of the gas and cleaning is performed at least primarily below the critical temperature and below the critical pressure of the gas. Carbon dioxide at temperatures between −20° C. and +20° C. is especially suitable. The mechanical interactions produced by the increased density and viscosity of the liquefied gas reinforce cleaning. Reduced solvent capacity does not influence the effectiveness of the cleaning. Textiles or components can therefore be cleaned at lower pressure and temperature.

22 Claims, 1 Drawing Sheet

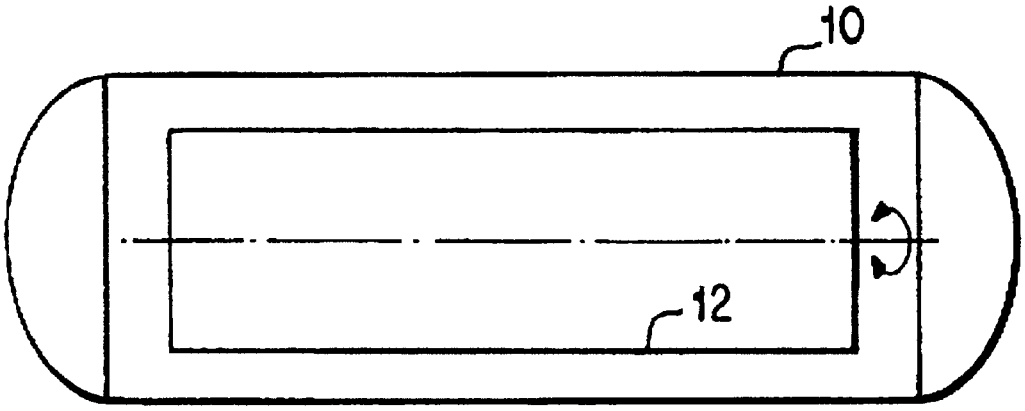
FIGURE

CLEANING WITH LIQUID GASES

Matter enclosed in heavy brackets [ ] appears in the original patent but forms no part of this reissue specification; matter printed in italics indicates the additions made by reissue.

BACKGROUND AND SUMMARY OF THE INVENTION

The invention relates to a method for cleaning objects in pressure vessel with liquefied gases.

A method of this kind for cleaning workpieces, especially metal pipes, containing organic residues such as oils and greases is known from patent application WO92/14558. In this application, liquefied gases such as carbon dioxide are used as the cleaning fluid. The cleaning fluid is conducted into a pressure vessel loaded with the workpieces and circulated therein by means of an impeller. After the cleaning process is complete, a portion of the fluid laden with organic residues is conducted out of the pressure vessel together with fresh cleaning fluid into another pressure vessel. The surface tension of the remainder of the fluid loaded with impurities is reduced by a turbine, causing the impurities to precipitate out. The cleaned workpieces are then removed from the empty pressure vessel, while additional workpieces can be cleaned in the second pressure vessel.

In addition, a device for cleaning smaller workpieces that uses liquefied gases is known from German patent document DE-42 30 385. In the German patent document, a drum is mounted rotatably and/or pivotably in a pressure-tight container and is connected to a drive device. The rotation of the drum sets both the cleaning fluid in the pressure-tight vessel and the objects present in the drum in turbulent motion, thus increasing the cleaning effect. Chemical solvents, mechanical scouring agents, and added insert gases can increase the cleaning effect. To permit quasi-continuous operation, at least one lock for loading and unloading the objects is provided on the pressure-tight vessel. These locks make it unnecessary to completely vent the pressure-tight vessel to load or remove the objects.

Liquid carbon dioxide at temperatures between 20° C. and approximately 30° C. is used in the method in the two patent documents mentioned above, with pressures corresponding to the vapor pressure values.

In addition, a method for cleaning textiles by means of liquefied or supercritical carbon dioxide is known from WO 94/01613. In this patent document, the carbon dioxide is conducted into a pressure vessel loaded with the textiles at temperatures between 20° C. and 100° C. and corresponding pressures between 60 and 350 bars. After the textiles have been washed, displacement rinsing is performed using a second fluid. The second fluid is again a compressed gas such as air or nitrogen.

A method for removing impurities from a substrate is known from WO 90/06189. In this patent document, a substrate is brought into contact by means of a compressed gas with fluid-like density at critical or supercritical pressure, with the phase of the gas being shifted between the liquid state and the supercritical state by varying the temperature of the gas in a series of stages between supercritical temperatures and subcritical temperatures. This multistage temperature variation is discontinued by a change in the cohesion energy content of the gas in the dense phase. An effort is therefore made to adjust the solvency of the compressed gas relative to an impurity in an effective manner.

Mechanical interactions between the compressed gas and the impurities are not taken into account.

These known cleaning methods utilize the cleaning ability of compressed fluids, which increases drastically in the supercritical range. Supercritical carbon dioxide with a temperature above 31° C. at pressures above 73.7 bars has a density comparable to the liquid phase and a good solvency that increases even further with an increase in temperature. Of course, the interactions of the fluid with the substance to be dissolved (impurities) are important for the success of the cleaning.

In the practical application, these cleaning methods suffer from an important disadvantage that lies in the use of high (supercritical) pressures, which in turn necessitates the use of expensive pressure vessels with high energy and equipment costs.

The goal of the present invention is therefore to develop a cleaning method using liquefied gases in which the same cleaning results can be achieved at lower cost.

This goal is achieved according to the invention by virtue of the fact that gas liquefied under pressure is conducted into the pressure vessel containing objects to be cleaned. The temperature of the liquefied gas is then (or even earlier) lowered below the critical temperature of the gas. Cleaning is conducted at least primarily below the critical temperature and below the critical temperature of the gas.

Other objects, advantages and novel features of the present invention will become apparent from the following detailed description of the invention when considered in conjunction with the accompanying drawing.

BRIEF DESCRIPTION OF THE DRAWING

The figure is a schematic diagram of a pressure vessel having a drum therein for use with the method according to the present invention.

DETAILED DESCRIPTION OF THE PREFERRED EMBODIMENTS

Surprisingly, it has been found that the density and viscosity of gases to be compressed to the liquid phase can be increased by lowering the temperature sufficiently far below its critical temperature. The mechanical interactions between the cleaning fluid and the impurities guarantee cleaning success although the solvency of the liquefied gas under these physical parameters is drastically reduced in comparison to the previous method.

The increased mechanical interaction lies in a higher mass transport of fluid to the surface to be cleaned because of the increased density and in the greater shearing forces between the fluid and the substrate surface because of the increased viscosity of the fluid. The viscosity increases exponentially with the reciprocal of the temperature.

To remove organic residues for example, noble gases such as helium or argon, hydrocarbons such as methane, ethylene, propane, ethene, or propene, as well as trifluoromethane, carbon dioxide, dinitrogen monoxide, and sulfur hexafluoride are suitable as fluids for example.

For cleaning, the liquefied gas is loaded into the pressure vessel until it fills a portion thereof. The liquefied gas is then in equilibrium with its gaseous phase. After a certain cleaning time, the pressure vessel may be further filled with liquefied gas until it is exclusively in the liquid phase. Then, the density and viscosity of the liquid can be increased even further when the pressure in the pressure vessel is increased while keeping the temperature constant.

For known reasons, carbon dioxide is especially preferable and is used at pressures from below 60 bars with an equilibrium of the liquid and gaseous phases at temperatures between −20° C. and +20° C. for the cleaning method according to the invention.

Unexpectedly, in this parameter range the mechanical interactions of the liquefied carbon dioxide with high density and viscosity overcome the reduced solvency.

During cleaning or at the beginning thereof, the pressure vessel can be filled completely with liquid carbon dioxide, with the temperature then being kept constant at a value between −20° C. and +20° C., and the pressure being raised to a value above the corresponding value on the vapor pressure curve.

The mechanical interactions can be increased if the liquefied gas and/or the object to be cleaned are circulated in the pressure vessel 10 (see the Figure). This is accomplished in known fashion via an impeller or a rotatable drum 12 in the pressure vessel 10.

If the pressure vessel is only partially filled with liquefied gas, additional frictional action on the surface of the contaminated objects takes place when the objects to be cleaned are circulated, as a result of the objects being constantly lifted out of, and submerged in, the liquid phase.

When a rotating drum is used, the mechanical interaction can be increased if the drum is operated intermittently and/or with a change in the direction of rotation (see arrows in the Figure).

Especially good cleaning results for contamination with organic residues such as oils and greases are obtained by using carbon dioxide at temperatures of 5° C. to 15° C., preferably 10° C.

In this type of cleaning, pressure values that are lower by comparison with the known method are especially advantageous, beginning with a temperature drop in contrast to the temperature increase required in earlier cleaning methods. This means firstly a reduced energy expenditure and secondly, lower system costs for system components that are resistant to high pressure. For the cleaning method according to the invention for example, liquefied carbon dioxide which is liquid at room temperature (25° C., 67 bars) is cooled to 10° C. and placed in a pressure vessel designed for approximately 100 bars. The addition of enzymes, emulsifiers, and/or surfactants (detergents) that are suitable for liquefied carbon dioxide for example can further increase the success of cleaning. Suitable additives will be found by the individual skilled in the art in the pertinent literature, for example in the specification of European Patent document EP-0 530 949-A1.

The method according to the invention has proven in many tests to be especially effective for cleaning textiles. It is also suitable for cleaning metal surfaces or electronic assemblies such as PC boards to remove impurities that mostly contain organic residues.

In one version of the method according to the invention, test fabric contaminated with various greases was cleaned in a pressure vessel to which liquefied carbon dioxide had been added. The pressure vessel contains a drum that rotates inside the pressure vessel, causing the textiles and the liquefied gas to move relative to one another. The gas is drawn from a supply container in which carbon dioxide liquefied under pressure is at ambient temperature, and the pressure vessel is partially filled. The temperature in the pressure vessel is lowered to about 10° C., while the drum is set rotating.

During cleaning, the liquid and gaseous phases through which the test fabrics are transported mix with one another, so that frictional effects occur that promote cleaning. If necessary, after a certain period of cleaning, the pressure vessel can be filled completely once again, and the temperature of the liquid carbon dioxide is kept constant at about 10° C. while the pressure is raised to more than 45 bars. The pressure can be increased up to 70 bars (below critical pressure), for example. Cleaning results however are completely sufficient with a lesser pressure increase, so that operating and system costs can be reduced significantly in comparison to previous cleaning methods.

The working of the method and possible addition of surfactants can be selected as a function of the type of contamination. After cleaning, the contaminated carbon dioxide is removed and can be reused after reduction of surface tension, when the impurities precipitate out. This contributes to environmental protection and reduces costs further.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for cleaning objects in a pressure vessel using carbon dioxide, the method comprising[the steps of]:

conducting the carbon dioxide under pressure into the pressure vessel containing the objects to be cleaned, *wherein the pressure vessel is only partially filled with liquid carbon dioxide*;

*maintaining or* lowering the temperature of the carbon dioxide below the critical temperature; and performing a cleaning operation at least primarily below the critical temperature and below the critical pressure of the carbon dioxide, wherein liquid and gas phases of the carbon dioxide are in equilibrium for a portion of the cleaning[,];

*wherein* the temperature is kept constant at a value between −20° C. and +20° C. and the pressure is raised to a value above the corresponding vapor pressure during a portion of the cleaning.

2. The method according to claim 1, wherein the cleaning operation further comprises the step of circulating at least one of the carbon dioxide and the objects to be cleaned in the pressure vessel.

3. The method according to claim 2, wherein said circulating step is carried out via a drum mounted at least one of rotatably and pivotably in the pressure vessel, and wherein said drum is operated at least one of intermittently and with a changing direction of rotation.

4. The method according to claim 1, wherein the carbon dioxide in the cleaning step is at a temperature of 5° C. to 15° C.

5. The method according to claim 1, wherein the carbon dioxide in the cleaning step is at a temperature of 15° C.

6. The method according to claim 1, further comprising the step of adding at least one of enzymes, emulsifiers, surfactants, and detergents to the carbon dioxide.

7. The method according to claim 1, wherein said method is used for cleaning textiles.

8. The method according to claim 1, wherein said method is used for cleaning components.

[9. The method according to claim 1, wherein the pressure vessel is only partially filled with the carbon dioxide.]

[10. The method according to claim 1, wherein the pressure vessel is completely filled with the carbon dioxide.]

11. The method according to claim 1, wherein the pressure of the carbon dioxide is below 60 bars.

*12. The method according to claim 2, wherein the carbon dioxide in the cleaning step is at a temperature of 5° C. to 15° C.*

*13. The method according to claim 4, wherein the carbon dioxide in the cleaning step is at a temperature of 10° C.*

*14. The method according to claim 2, further comprising the step of adding at least one of enzymes, emulsifiers, surfactants, and detergents to the carbon dioxide.*

*15. The method according to claim 4, further comprising the step of adding at least one of enzymes, emulsifiers, surfactants, and detergents to the carbon dioxide.*

*16. The method according to claim 1, wherein the pressure of the carbon dioxide is between 45 and 70 bars.*

*17. The method according to claim 4, wherein the pressure of the carbon dioxide is between 45 and 70 bars.*

*18. The method according to claim 12, wherein the pressure of the carbon dioxide is between 45 and 70 bars.*

*19. The method according to claim 15, wherein the pressure of the carbon dioxide is between 45 and 70 bars.*

*20. The method according to claim 1, wherein the pressure of the carbon dioxide is above 45 bars.*

*21. The method according to claim 4, wherein the pressure of the carbon dioxide is above 45 bars.*

*22. A method according to claim 1, wherein the temperature of the carbon dioxide is maintained below the critical temperature.*

*23. A method for cleaning objects in a pressure vessel using carbon dioxide, the method comprising:*

*conducting the carbon dioxide under pressure into the pressure vessel containing the objects to be cleaned, wherein the pressure vessel is only partially filled with liquid carbon dioxide;*

*maintaining or lowering the temperature of the carbon dioxide below the critical temperature;*

*adding enzymes to the carbon dioxide; and*

*performing a cleaning operation at least primarily below the critical temperature and below the critical pressure of the carbon dioxide, wherein liquid and gas phases of the carbon dioxide are in equilibrium for a portion of the cleaning;*

*wherein the temperature is kept constant at a value between −20° C. and +20° C. and the pressure is raised to a value above the corresponding vapor pressure during a portion of the cleaning.*

*24. A method for cleaning objects in a pressure vessel using carbon dioxide, the method comprising:*

*conducting the carbon dioxide under pressure into the pressure vessel containing at least one of an electronic assembly or an object having a metal surface, wherein the pressure vessel is only partially filled with liquid carbon dioxide;*

*maintaining or lowering the temperature of the carbon dioxide below the critical temperature; and*

*performing a cleaning operation at least primarily below the critical temperature and below the critical pressure of the carbon dioxide, wherein liquid and gas phases of the carbon dioxide are in equilibrium for a portion of the cleaning;*

*wherein the temperature is kept constant at a value between −20° C. and +20° C. and the pressure is raised to a value above the corresponding vapor pressure during a portion of the cleaning.*

* * * * *